May 30, 1967 J. A. ROTHMAN 3,322,906

MAGAZINE UTILIZING INTERNAL TAPE DRIVE MEANS

Filed April 19, 1963 3 Sheets-Sheet 1

Jules A. Rothman INVENTOR.

BY

Ezekiel Wolf, Wolf + Greenfield

ATTORNEYS

May 30, 1967 J. A. ROTHMAN 3,322,906

MAGAZINE UTILIZING INTERNAL TAPE DRIVE MEANS

Filed April 19, 1963 3 Sheets-Sheet 2

INVENTOR.

Jules A. Rothman

BY

Ezekiel Wolf, Wolf & Greenfield

ATTORNEYS

MAGAZINE UTILIZING INTERNAL TAPE DRIVE MEANS

Filed April 19, 1963 3 Sheets-Sheet 3

Jules A. Rothman INVENTOR.
BY
Ezekiel Wolf, Wolf + Greenfield
ATTORNEYS

United States Patent Office 3,322,906
Patented May 30, 1967

3,322,906
MAGAZINE UTILIZING INTERNAL TAPE DRIVE MEANS

Jules A. Rothman, Boston, Mass., assignor to Automatic Radio Mfg. Co., Inc., Boston, Mass., a corporation of Massachusetts Filed Apr. 19, 1963, Ser. No. 274,230
14 Claims. (Cl. 179—100.2)

The present invention relates to a new and improved signal reproducing apparatus and more particularly to sound reproducers for information recorded on a recording tape. An information containing tape cassette is provided in the apparatus which is extremely efficient, lightweight, inexpensive and constructed with a minimized amount of complexity. The cassette may be rapidly exchanged for another similar cassette containing a tape carrying information different from the information carried by the tape within the first cassette.

Many magnetic tape-reproducing devices are known. In some of these devices, a cassette or tape magazine is used. Problems arise particularly in the "talking book" or "talking newspaper" type of tape-reproducers where the cassette must be relatively inexpensive so that the user may easily afford to have a number of different taped messages recorded on a plurality of cassettes. In many of these prior art devices the cassettes are relatively expensive or inadequate, since simple and efficient driving and storing means for the tape could not be inexpensively produced without sacrificing ease of threading the tape, accurate driving of the tape without slippage, and/or prevention of premature tape destruction by the driving mechanism.

Accordingly, it is an important object of this invention to provide a portable, lightweight, sound-reproducing apparatus in which removable cassettes carrying recorded information may be positioned or exchanged rapidly and efficiently.

It is another object of this invention to provide an apparatus in accordance with the preceding object wherein the cassette contains means for allowing positive drive of a sound reproducing medium while preventing premature wearing and destruction of the medium.

It is still a further object of this invention to provide an apparatus in accordance with the preceding objects which is highly compact and thus may have the outer appearance of a book, ornament, doll or other device.

A sound-reproducing apparatus in accordance with this invention has a body carrying a tape-drive mechanism, a magnetic transducer or reproducing head, and a pocket or compartment into which a tape carrying cassette may be positioned. The cassette has an enclosing casing carrying an elongated, preferably endless recording medium. An elongated backing member is provided within the casing which carries means for straightening and tensioning a portion of the recording medium and a counterplate for backing the recording medium to properly position it against the reproducing head. At least one fed roll is mounted in the cassette. The feed roll has a cylindrical outer surface with a portion of the outer surface positioned adjacent an opening defined by the casing while a second portion of a cylindrical outer roll surface is adapted to grip a portion of the recording medium. When the cassette is in position in the body, the feed roll is operatively engaged with a drive roll carried by the body and the recording medium is operatively engaged with a reproducing head carried by the body.

In a preferred form, two relatively large diameter feed rolls are contained within the casing and the recording medium is positioned to pass betwen the two rolls. This feature is significant since the two feed rolls may be positively positioned when the cassette is built so that the exact predetermined amount of pressure on the recording medium will be produced when it is passed between the rolls. Thus, jamming, slippage and premature wearing of the recording medium may be avoided. In a preferred form of the invention, the body is in the form of a book and has a pocket allowing insertion of a generally rectangular cassette. The cassette carries electrical contact means for automatically actuating a drive motor and amplification system carried in the body.

Other features, objects and advantages of the invention will be better understood and appreciated from the following detailed description of one embodiment thereof selected for purposes of illustration and shown in the accompanying drawings in which.

Figure 1:
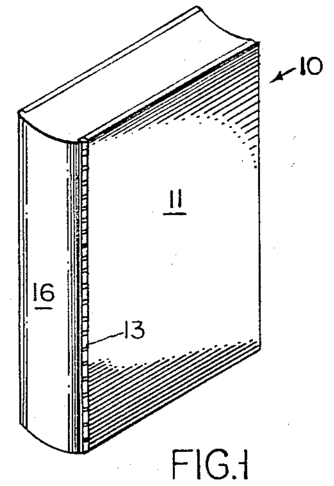
FIG. 1 is a front perespective view of a preferred embodiment of this invention.
Figure 2:
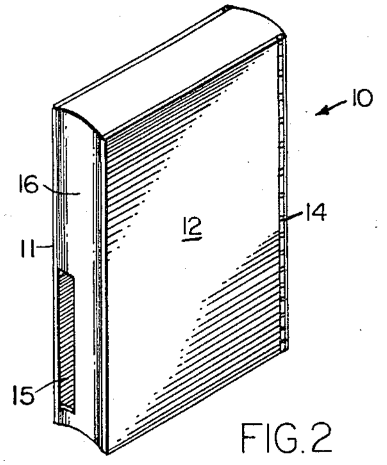
FIG. 2 is a rear perspective view thereof.

According to the invention, the sound-reproducing apparatus having the form of a book 10 is shown in FIGS. 1 and 2. The book 10 comprises a flat, rectangular, front cover 11 hinged at 13 to a base 16 of the book which simulates the binding and pages of a conventional book while a flat, rectangular back cover 12 is provided hinged at 14 to the base 16. Conventional fastening means (not shown) are provided to hold the front and back covers 11 and 12 in the position shown in FIG. 2 during normal usage of the sound-reproducing book or "talking book" 10. The body portion 16 as well as the front and back cover panels 11 and 12 are preferably composed of a plastic material, although wood, metal and other materials may be used if desired.

Figure 3:
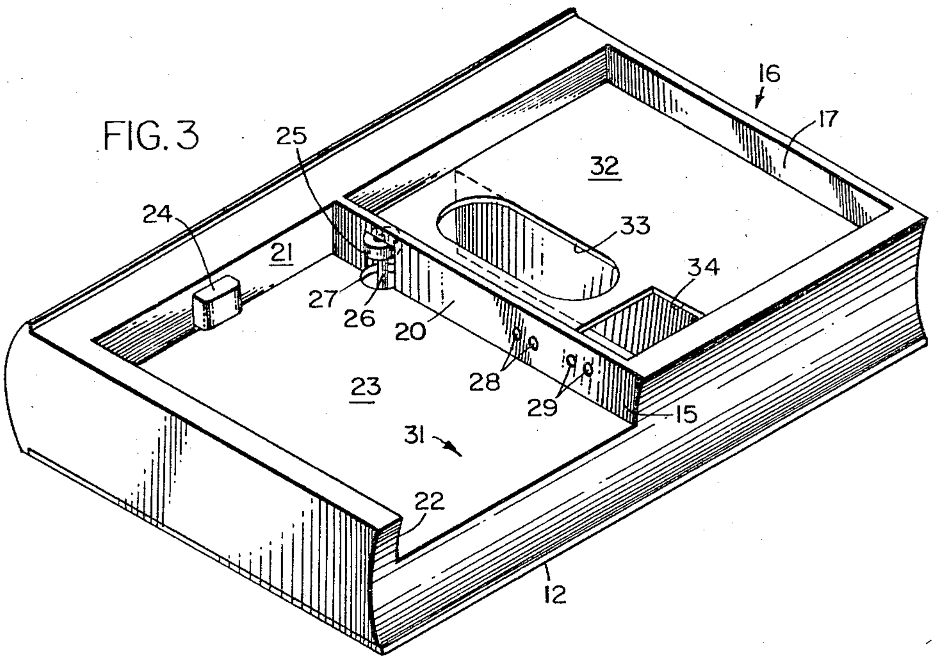
FIG. 3 is a top perspective view of a base portion of this invention.
Figure 4:
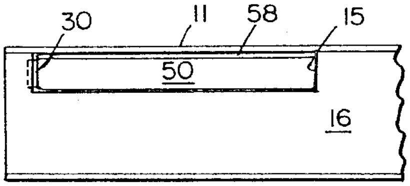
FIG. 4 is a fragmentary side view thereof.
Figure 5:
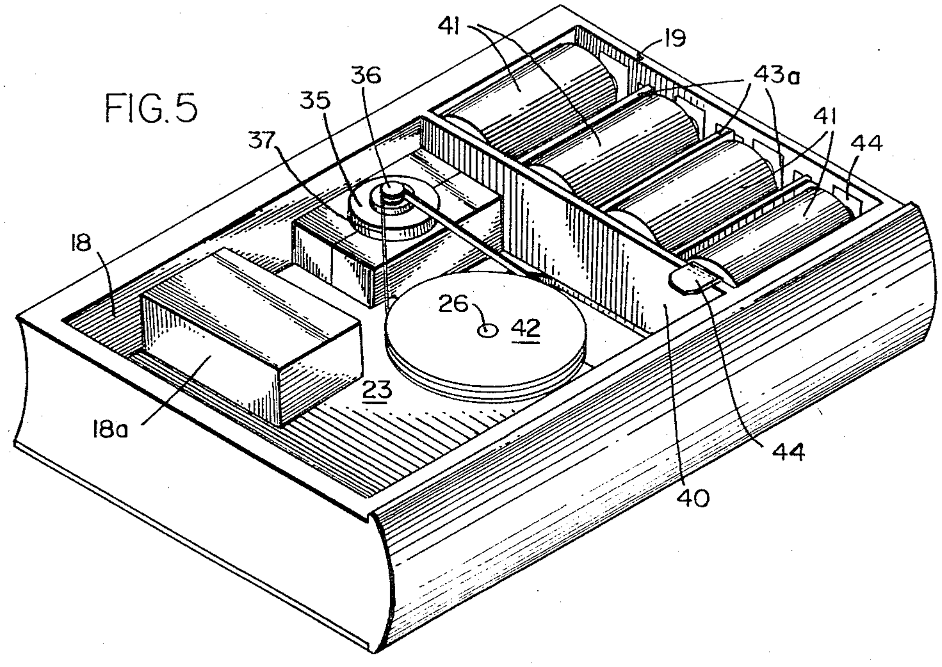
FIG. 5 is a bottom perspective view of the base shown in FIG. 3.

As best shown in FIGS. 3, 4 and 5 the body 16 is divided into a cassette receiving section or compartment 15, a storage compartment 17 both lying beneath the cover 11 and a drive motor and amplification system compartment 18, with a power supply compartment 19 facing and adjacent the rear cover 12. The cassette receiving compartment 15 is defined by parallel side walls 20 and 22, end wall 21 and rectangular base board 23. A sound reproducing head or magnetic transducer 24 is mounted on the end wall 21 and projects into the compartment 15. A drive roll shaft 26 projects through a circular opening 27 provided in the base 23 and carries a power driven drive roll 25 mounted for rotation about shaft 26 and located partially within a corresponding recess provided in wall 20 partially projecting into the cassette receiving compartment 15. Preferably amplifier contacts 28 and drive motor contacts 29 are mounted on side wall 20 and are slightly raised above a surface of the wall 20. An elongated spring blade 30 is firmly attached to wall 22 and preferably extends for a substantial proportion of the length of this wall. The spring blade 30 is designed to allow a cassette to be inserted in the compartment 15, hold the cassette within the compartment and resiliently urge selected pre-aligned portions of the cassette against the drive roll 26 and contacts 28 and 29. The spring blade 30 also provides sufficient force to prevent the cassette from moving towards or away from the transducer 24, yet, allows the cassette to be removed from the compartment in the direction of the arrow shown at 31 by grasping an end of the cassette and pulling it out of the compartment 15.

Storage compartment 17 has a flat base panel 32 which is a thin plastic rectangular member having cutout portions 33 and 34 which provide visual access to an underlying amplification and drive motor compartment 18. These cutouts are useful in providing for access and circulation of air to electrical components of the apparatus 10 as will be described. In use, the storage compartment 17 may contain pictorial illustrations or written matter corresponding to the sound track in the cassetes which are used with the book 10.

Compartment 18 (FIG. 5) is preferably generally rectangular and houses a conventional amplification system diagrammatically illustrated at 18*a* comprising an amplifier attached to the magnetic transducer 24 and electrically connected to a power supply source and a sound speaker (not shown). Preferably the speaker is mounted directly beneath the cutout 33 in the compartment 18 or may be mounted adjacent a speaker screen attached to the rear cover 12. A drive unit for the tape is also mounted in the compartment 18 as shown in FIG. 5.

Figure 7:
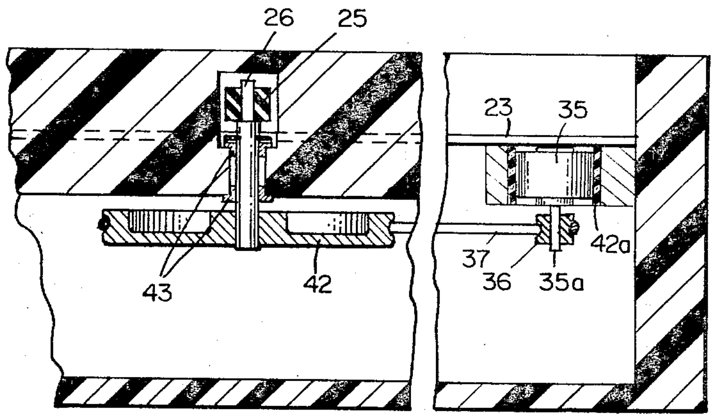
FIG. 7 is a cross-sectional view through a drive mechanism of this invention taken through line 7—7 of FIG. 8; and, FIG. 8 is a top plan view showing a base of this invention with an alternate embodiment of a cassette of this invention.

The drive unit comprises a small D.-C. electric motor 35 having a shaft 35*a* extending into compartment 18 parallel with drive shaft 26 as best shown in FIG. 7. A small diameter pulley 36 is attached to the drive shaft 35*a*. The motor 35 is attached to the base 23 as by a mounting ring or ferrule 42*a* which is preferably composed of a resilient material allowing the motor 35 to be resiliently forced fit into an opening provided in the base 23. Drive roll 25 preferably of a hard rubber material is attached to the drive shaft 26 at an upper end as shown in FIGS. 3 and 7. The shaft 26 extends downwardly into the compartment 18 and has a large diameter pulley 42 attached to a lower end. An intermediate portion of the shaft 26 is suitably journaled for rotation in conventional sliding bearings 43 mounted on a circular opening in the base 23 as best seen in FIG. 7. A conventional drive belt 37 links pulley 36 to pulley 42. Poles of the motor 35 are electrically connected to motor contacts 29 (FIG. 3) which are in turn connected to a power supply source as will be described. Preferably the motor pulley 36 has a relatively small radius which may be for example ¼", while pulley 42 has a large diameter which may be for example 1 and ½". Thus, a low power, high speed motor 35 may be used and the speed is cut down by the large diameter wheel 42 and drive roll 25. The particular proportions and dimensions of the pulleys may vary depending upon the desired ultimate tape speed and particular motor used. In addition to reducing the speed of the motor the use of the relatively large pulley 42 having a correspondingly high weight enables the pulley 42 to have a fly-wheel type affect which tends to overcome and even-off slight variations in the speed of the motor 35. Motor speed variations may be occasioned by gradual wearing down of the electric power supply source used.

As best shown in FIG. 5, the electric power supply for the book 10 is preferably a set of four standard "D" flashlight batteries 41. Preferably, the batteries 41 are inserted into compartments and separated by separator plates 43*a* and transverse separator wall 40. Suitable conventional terminal connection plates are provided as shown in 44. It is preferred that a two circuit system be used for the book 10. However, the particular circuitry connecting the batteries, motor and amplification system may be varied as desired in accordance with known practice.

Figure 6:
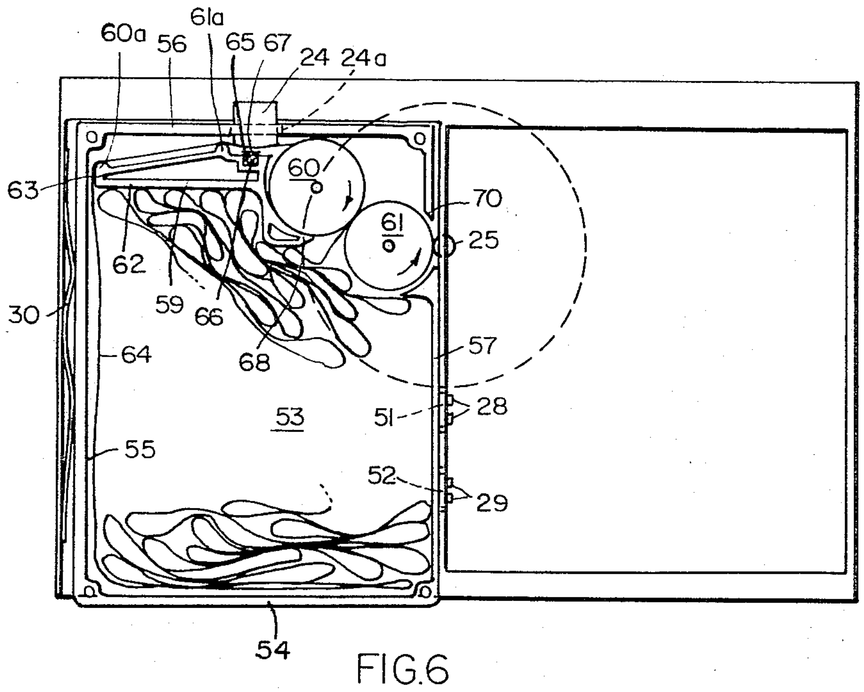
FIG. 6 is a top plan view of the device of FIG. 1, showing a preferred embodiment of a cassette of this invention with the cover of the cassette removed.

A preferred embodiment of a cassette in accordance with this invention is shown in FIGS. 4 and 6. The enclosed cassette 50 is generally rectangular in shape and comprises an integral bottom casing base 53 having upstanding side walls 54, 55, 56 and 57. In a preferred form a flat cover plate 58 is provided as shown in FIG. 4. A backing member 59 and a pair of feed rollers 60 and 61 are mounted on the casing base 53.

The backing member 59 is preferably an integral plastic piece firmly attached to the bottom of the casing 53 and has an arm 62 with an end 63 lying closely adjacent wall 55 but allowing passage therebetween of an endless tape 64 contained within a major portion or magazine section of the cassette 50. Parallel ridges 60*a* and 61*a* extend from the casing bottom 53 to the casing cover 58 and provide a straightening and tensioning means in conjunction with end 63 for the tape 64 when the tape is pulled over these ridges. An indentation is provided in the backing member 59 in which is mounted a counter plate 65 which comprises a yieldable rubber base 66 having a surface layer of a soft felt material 67. The counter-plate 65 directly abuts the transducer or reproducing head 24 when the cassette is positioned in the compartment 15. The reproducing head 24 preferably extends into the cassette through an opening 24*a* provided in wall 56. Tape 64 is automatically positioned between the counter-plate and transducer in this position as shown in FIG. 6. A portion of the tape is threaded around a portion of the roll 60 and passes between the feed rolls 60 and 61.

Feed rolls 60 and 61 are preferably equal sized and have a substantially large diameter as compared with drive roll 25. Feed rolls 60 and 61 are mounted on parallel spindles extending upwardly from the casing bottom. The feed rolls 60 and 61 act as squeeze rolls and when rotated pull the tape 64 from the end portion 63 of the backing member between the rolls and back into the magazine portion of the cassette. A wiper arm 68 comprising an arcuate faced extension of backing member 59 is provided surrounding a portion of feed rolls 60 to prevent the tape from becoming tangled or fed back about the feed rolls. Preferably feed rolls 60 and 61 are composed of hard rubber or plastic material and are designed to provide a predetermined amount of pressure on the tape allowing the tape to the pulled through the rolls without undue crushing action or slippage of the tape.

The outer surface of feed roll 61 has a portion which is exposed to the outside of the cassette through an opening 70 provided in wall 57. The feed roll 61 is positioned in the cassette so that when the cassette is inserted into the compartment 15, a small portion of the outer surface which is exposed directly abuts and is resiliently pressed against the drive roll 25. Pressure is exerted by a spring 30 mounted on a side wall of compartment 15. The spring 30 is preferably an elongated spring which has sufficient resiliency to press the cassette against separator 20 and hold the cassette within the compartment 15 with the counter-plate 65 urged against the transducer 24.

Bus bars 51 and 52 are mounted on an outside of side wall 57 and are prealigned so as to close amplifier contacts 28 and motor contacts 29 when the cassette is positioned in the compartment. An overhanging lip (FIG. 6) formed in the bottom portion of wall 54 is provided which may have a grooved underneath portion (not shown) allowing the cassette to be easily slid out of the compartment 15 in the direction of the arrow 31 (FIG. 3). Thus, positioning of the cassette in body 16 automatically activates the drive and amplification systems causing a prerecorded message on the tape to be continuously given out by the book 10.

Figure 8:
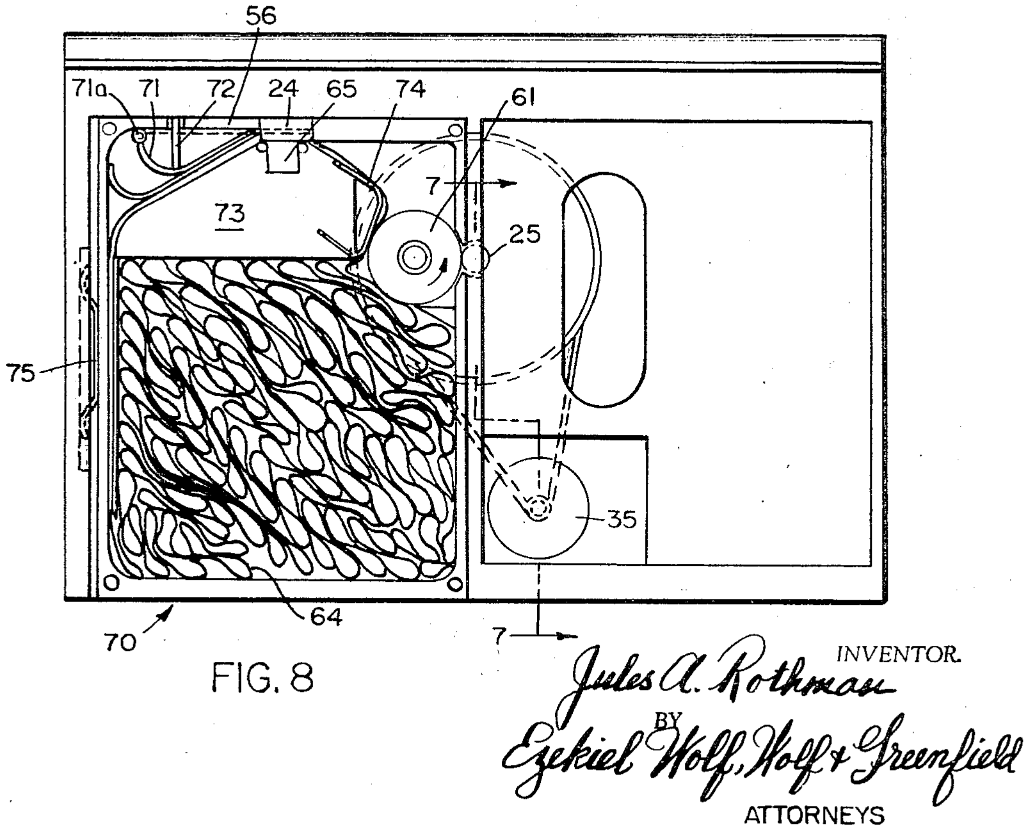

In an alternate embodiment of the invention, shown in FIG. 8, a cassette of the type shown at 70 is employed. In the cassette 70 a single feed roll 61 is used and a generally U-shaped spring is provided mounted on a backing block 73. The spring 74 replaces the feed roll 60 of cassette 50. In this embodiment a second spring member 71 is employed and is preferably J-shaped as shown in FIG. 8 and attached at an upper end 71*a* to the body of the cassette 70. All other parts of the cassette 70 are identical with cassette 50. The body 16 is modified by being provided with a stiff projection 72 and a slightly smaller spring member 75. A corresponding prealigned opening is provided in wall 56 of the cassette 70 to allow insertion of the stiff member 72 when the cassette is slid into compartment 15. Upon insertion of cassette 70 in body 16 the motor and amplification system are actuated and member 72 presses against the J-shaped spring 71 urging the spring against the endless tape 64 which is in turn straightened and tensioned against the backing member 73. Rotation of feed roll 61 in the direction of the arrow shown, pulls the tapes 64 across the backing member 73 and feeds it into the storage portion of the cassette.

While certain preferred embodiments of the invention have been specifically described and illustrated many modifications and variations are possible within the scope of this invention. For example, although it is preferred to employ a thin, endless, plastic magnetic recording tape, other conventional recording media may be used. The particular design of the body 16 may be varied and in some cases may take the form of a doll, newspaper, child's toy, etc. Particular materials used in the body or cassette may vary although plastics are preferred due to their lightweight and low cost. Although the overall size of the book 10 is approximately 8 inches by 11 inches by 2 and ½ inches, smaller or larger dimension may be used. In some cases the plastic casing of the cassette or book body may be transparent enabling a user to see the actual operation of the device. Alternatively, cover 11 may be eliminated enabling ease of insertation of the cassette and clear viewing of compartments 15 and 17.

This invention is to be limited only by the spirit and scope of the appended claims.

What is claimed is:

1. A cassette for use in conjunction with a sound reproducing apparatus,
   said cassette comprising an enclosing casing,
   an elongated, thin, endless recording medium contained within said casing,
   a backing member within said casing and means for tensioning a portion of said recording medium whereby said medium may be properly positioned against a reproducing head,
   and a roller within said casing having a cylindrical outer surface with a portion of said outer surface positioned adjacent an opening defined by said casing so as to coact with an external drive means and a second portion of said outer surface positioned adjacent a roller backing means, a portion of said endless recording medium being gripped between said second portion and said roller backing means and being constantly fed adjacent and over said backing member when said roller is actuated.

2. A cassette in accordance with claim 1 wherein said endless recording medium is a tape and said roller backing means is a second roller, said second roller being entirely enclosed within said casing.

3. A cassette in accordance with claim 1 wherein said endless recording medium is a tape and said roller backing means is a spring.

4. A cassette for use in conjunction with a sound reproducing apparatus said cassette comprising,
   an enclosing casing,
   an elongated, thin, endless magnetic tape contained within said casing,
   a backing member carrying means for straightening and tensioning a portion of said tape,
   a counter plate for a magnetic transducer adjacent said straightening and tensioning means and aligned with an opening defined by said casing and positioned opposite said transducer so as to coact with said transducer, said tape being threaded over said counter plate,
   first and second feed rolls mounted within said casing for rotation on parallel axes with a portion of said tape passing between said rollers within said casing and lying in direct contact with each roller on opposite surfaces of said tape said first roller being adjacent said counterplate whereby rotation of said rollers causes said tape to be fed over said straightening and tensioning means and said counter plate through said rollers and into a storage compartment provided in said casing,
   said first roller being contained entirely within said casing and said second roller having an outer cylindrical surface with a portion of said surface exposed to the outside of said casing by an opening defined by said casing,
   said exposed portion being positioned to engage at said opening a power driver roll in a sound reproducing apparatus in which the cassette is employed.

5. A sound reproducing apparatus comprising,
   a compact body comprising a sound amplification means, a power supply means and a drive means,
   said body defining a compartment for insertion therein of a cassette,
   a drive roll and a reproducing head mounted in said body and projecting into said compartment into predetermined positions,
   a cassette positioned in said compartment and carrying a magnetic tape having a sound track thereon,
   said cassette having an enclosing housing containing said tape, a tape backing member, a counter plate adjacent said backing member and a feed roll,
   said enclosing housing defining an opening adjacent said counter plate and a second opening being defined by said housing adjacent said feed roll with said openings lying in predetermined positions corresponding with said first mentioned predetermined positions whereby said feed roll and said counter plate are respectively operatively engaged with said drive roll and said reproducing head,
   said tape having a portion overlying said backing member and threaded between said reproducing head and said counter plate with an adjacent portion of said tape operatively engaged within said housing with said feed roll and extending past said feed roll to a storage compartment of said cassette whereby rotation of said feed roll causes movement of said tape over said backing member between said reproducing head and counter plate through said operative engagement and then into said storage compartment.

6. An apparatus in accordance with claim 5 wherein said backing member includes a resilient means urging said tape against said feed roll in operative engagement within said housing whereby said rotation of said feed roll causes said movement.

7. An apparatus in accordance with claim 5 wherein said cassette is held in said body compartment by resilient spring pressure.

8. An apparatus in accordance with claim 7 wherein said cassette carries means for slidably electrically connecting said amplification means and said drive means with said power supply simultaneously with insertion of said cassette in said body.

9. A sound reproducing electrical apparatus comprising,
   a compact body carrying a sound amplification means, an electric power source and a drive means,
   said body defining a compartment for insertion therein of a tape carrying cassette,
   a drive roll and a reproducing head mounted in said body and projecting into predetermined positions within said compartment,
   a cassette carrying a magnetic endless, thin, tape having a sound track recorded thereon and positioned in said compartment,
   said cassette having an enclosing housing containing said endless tape, a tape backing member, a counter plate adjacent said backing member, and a set of feed rolls, said set of feed rolls being mounted within said housing so as to have one feed roll having an outer cylindrical surface with a portion of said surface exposed to the outside of said housing by a first opening defined by said housing and a second feed roll contained entirely within said housing, said enclosing housing defining a second opening adjacent said counter plate and defining said first opening adjacent one of said feed rolls with said openings lying in predetermined positions corresponding with said first mentioned predetermined positions whereby said one feed roll and said counter plate are respectively operatively engaged with said drive roll and said reproducing head, said tape having a major portion thereof located in a storage compartment of said cassette and having a minor portion thereof overlying said backing member and threaded between said reproducing head and said counter plate, an adjacent portion of said tape being threaded within said housing between said feed rolls and operatively engaged therewith and extending past said feed rolls to a storage compartment of said cassette whereby rotation of said feed roll set by said drive roll causes movement of said tape over said backing member, between said reproducing head and counter plate between said feed rolls and then into said storage compartment.

10. An apparatus in accordance with claim 9 wherein said feed roll set comprises two feed rolls mounted in said cassette for rotation around parallel axes with each of said feed rolls being of equal diameter.

11. An apparatus in accordance with claim 9 wherein said drive means comprises said drive roll mounted on a drive roll shaft, said shaft having mounted thereon a first pulley, means inter-engaging said first pulley with a shaft of an electric motor with said first pulley having a diameter substantially larger than the shaft of said motor whereby said first pulley acts to decrease rotational speed of said drive roll with respect to the rotational speed of said motor shaft.

12. An apparatus in accordance with claim 9 wherein said backing member comprises an arcuate faced extension surrounding a portion of a second one of said feed rolls, with said extension preventing tangling of said tape during operation of said feed rolls.

13. In a sound-reproducing apparatus having a compartment into which projects a sound-reproducing head and a drive roll in predetermined positions, the improvement comprising, a cassette having an enclosing housing, said cassette containing an endless, thin, magnetic tape carrying a recorded message, a backing member mounted within said cassette and carrying a resilient counter plate positioned adjacent said backing member and operatively engaged with said reproducing head through an opening defined by said housing, two feed rolls mounted within said housing for rotation on parallel axes with one of said feed rolls located adjacent an opening defined by said cassette whereby said one feed roll may operatively engage said drive roll when said cassette is positioned within said compartment, a portion of said endless tape passing within the cassette between said feed rolls, said endless tape thereby being threaded over said backing member between said reproducing head and said counter plate and between said feed rolls within said housing whereby rotation of said feed rolls continuously moves a portion of said tape between said counter plate and reproducing head.

14. The improvement in accordance with claim 13 and further comprising means carried by said cassette for actuating movement of said drive roll and operation of said reproducing head when said cassette is slid into position in said compartment.

References Cited

UNITED STATES PATENTS

| | | | |
|---|---|---|---|
| 2,679,394 | 5/1954 | Lear | 179—100.2 |
| 2,804,508 | 8/1957 | Mastling et al. | 179—100.2 |
| 3,265,817 | 8/1966 | Gilman | 179—100.2 |

OTHER REFERENCES

1959, Princeton, New Jersey, J. B. Halter, "Magnetic Tape Cartridge," RCA TN No. 202, RCA Laboratories.

BERNARD KONICK, *Primary Examiner.*

L. G. KURLAND, *Assistant Examiner.*